XR  3,697,755

United States Patent
Boissevain et al.

[15] 3,697,755
[45] Oct. 10, 1972

[54] ENCLOSURE WITH RADIATION SOURCE HAVING FAIL SAFE SHUTTER

[72] Inventors: Mathew G. Boissevain, Los Altos Hills; Robert C. Hill, Santa Clara, both of Calif.

[73] Assignee: Measurex Corporation, Santa Clara, Calif.

[22] Filed: Jan. 17, 1969

[21] Appl. No.: 792,088

[52] U.S. Cl.................................250/106 S, 250/105
[51] Int. Cl..............................G21h 5/00, G21f 5/02
[58] Field of Search..........................250/105, 106 S

[56] References Cited

UNITED STATES PATENTS 3,560,748   2/1971   Hatten....................250/106 S

*Primary Examiner*—Archie R. Borchelt
*Attorney*—Flehr, Hohbach, Test, Albritton & Herbert

[57] ABSTRACT

Enclosure with radiation source having fail-safe shutter means comprising a body having a cavity formed therein with the radiation source disposed in the cavity. The body is provided with a passage through which radiation can pass. Shutter means is carried by the body and is movable between open and closed positions with respect to the passage. Means is provided for yieldably urging the shutter means towards a closed position and solenoid operated means is provided for moving the shutter means to an open position against the force of the yieldable means. Temperature responsive means independent of the solenoid operated means is provided for moving the shutter means to a closed position when a predetermined temperature is reached even though the solenoid operated means remains energized.

7 Claims, 4 Drawing Figures

PATENTED OCT 10 1972

3,697,755

INVENTORS
Mathew G. Boissevain
BY Robert C. Hill
Flehr, Hohbach, Test,
Albritton & Herbert
Attorneys

3,697,755

ENCLOSURE WITH RADIATION SOURCE HAVING FAIL SAFE SHUTTER

BACKGROUND OF THE INVENTION

Enclosures have heretofore been provided for radiation sources; however, such enclosures have had several disadvantages. For example, they have not been fail-safe under all circumstances. In addition, they have been unduly bulky. There is, therefore, a need for a new and improved enclosure for radiation sources.

SUMMARY OF THE INVENTION AND OBJECTS

The enclosure with a radiation source consists of a body in which the body has a cavity formed therein. A radiation source is disposed in the cavity. The body is provided with a passage which is in alignment with the source whereby radiation from the source can pass through the passage. Shutter means is carried by the body and is movable between open and closed positions with respect to the passage. The shutter means in a closed position prevents radiation from the source from passing from the passage. Means is provided for moving the shutter means to an open position. In addition, means is provided for closing the shutter means. Fail-safe means permits said means for closing the shutter to move said shutter means to a closed position in the event certain conditions arise.

In general, it is an object of the present invention to provide an enclosure with a radiation source which is safe under all conditions.

Another object of the invention is to provide an enclosure with a radiation source which is relatively simple in construction and compact.

Another object of the invention is to provide an enclosure with a radiation source which is fail-safe.

Additional objects and advantages of the invention will appear from the following description in which the preferred embodiment is set forth in detail in conjunction with the accompanying drawing.

DESCRIPTION OF PREFERRED EMBODIMENT

Figure 1:
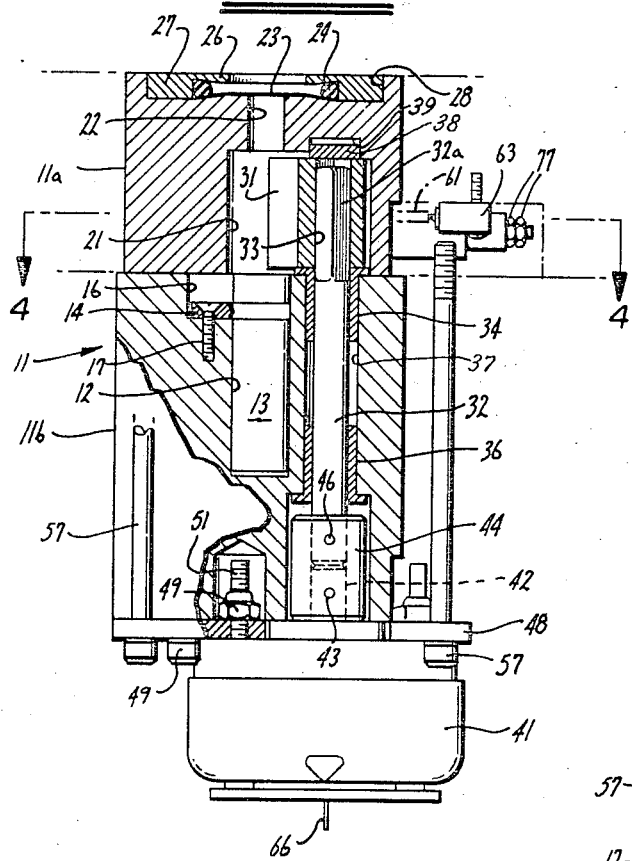
FIG. 1 is a side elevational view partly in cross-section of an enclosure with a radiation source incorporating the present invention.
Figure 3:
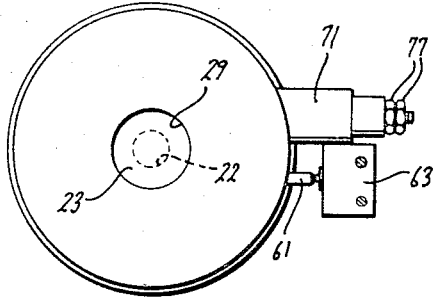
FIG. 3 is a top plan view of the enclosure with the radiation source shown in FIG. 1.

The enclosure with radiation source consists of a body 11 which is formed in two sections, an upper section 11a and a lower section 11b. Both sections 11a and 11b are substantially cylindrical and are formed of a suitable material which has high shielding characteristics as, for example, Mallory metal. The lower section 11b of the body 11 is provided with a cylindrical cavity or recess 12 which receives the source 13. The source 13 is a nuclear source and can be of any suitable type. For example, it can be Strontium 90 which is in a stainless steel capsule. The capsule source is provided with a generally semi-circular flange 14 which is mounted in an offset 16 provided in the lower section 11b and secured to the lower section 11b by screws 17.

The source 13 is in axial alignment with a large recess 21 provided in the upper section 11a and a passage 22 which opens into the recess 21. A window 23 of a suitable material which is transparent to radiation from the source 13 overlies the outer extremity of the passage 23. One material found to be suitable consists of a polyester film. The window is held in place by an O-ring 24 and the O-ring is held in place by an inwardly extending annular flange provided on a ring 27 mounted within an annular recess 28 provided on the upper extremity of the upper section 11a. The ring 27 is provided with an opening 29 which also has its center in axial alignment with the source 13.

Shutter means is provided which is movable between open and closed positions to prevent the passage of radiation into the passage 22 or to prevent it from passing out of the recess 12. This shutter means consists of a generally fan-shaped shutter member 31 which is also formed of a material which has excellent shielding characteristics such as Mallory metal. The shutter member 31 has a substantial thickness as shown in FIG. 1. The shutter member is movable from an open position shown in solid lines in FIG. 4 to a closed position which is shown in broken lines in FIG. 4. As can be seen, in the closed position, it overlies the source 13 to prevent radiation therefrom from escaping from the body 12 through the window 23. The shutter member 31 is mounted upon a shaft 32 for pivotal movement between the open and closed positions. The shaft 32 is provided with a squared end portion 32a which mates with a milled bore 33 which is square in cross-section in the shutter member 31. The shaft 32 is rotatably mounted in upper and lower sleeve bearings 34 and 36 mounted in a bore 37 provided in the lower body section 11b. A thrust bearing 38 seated in a recess 39 in body section 11a engages a surface of the shutter member 31.

Means is provided for yieldably urging the shutter member 31 to its closed position and also for moving the shutter member 31 to an open position against the force of the yieldable means. This means consists of a rotary solenoid 41 such as one manufactured by Ledex. Such a rotary solenoid is well known to those skilled in the art and has a suitable stroke such as 45° and also is provided spring means (not shown) for returning the rotary solenoid to normal position. The solenoid is provided with an output shaft 42 which is pinned by pin 43 to a sleeve 44. The sleeve 44 is pinned by pin 46 to the shaft 32. The rotary solenoid 41 is secured to a mounting plate 48 by nuts 49 which are threaded onto threaded screws 51. Thus, it can be seen that when the rotary solenoid is energized, the shutter member 31 is moved to an open position and when it is deenergized, it is moved to a closed position.

The mounting plate 48 is secured to the lower body section 11b by screws 54. The body sections 11a and 11b are maintained in alignment by dowel pins 56 (see FIG. 4). The entire enclosure with the source is adapted to be mounted in a gauging assembly such as that described in copending application Ser. No. 792,007, filed Jan. 17, 1969, by a plurality of cap screws 57 which extend upwardly through the mounting plate 48.

Figure 4:
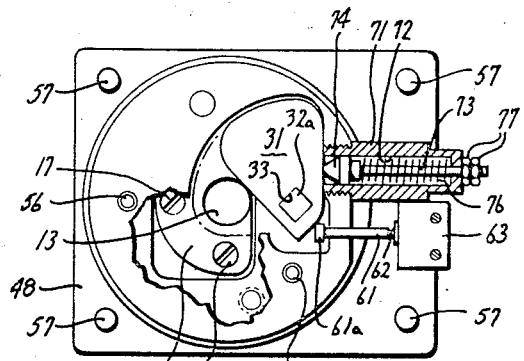
FIG. 4 is a cross-sectional view taken along the line 4—4 of FIG. 1.
Figure 2:
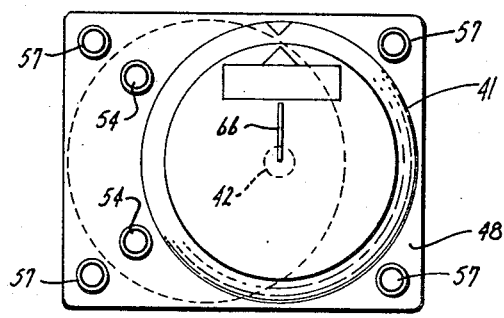
FIG. 2 is a bottom plan view of the enclosure with the radiation source shown in FIG. 1.

Means is provided for sensing the position of the shutter member 31 and consists of a shutter sensing pin 61 slidably mounted in the upper body section 11a and which has a head 61a which is adapted to engage the shutter member (see FIG. 4). The pin 61 extends outwardly and is adapted to engage the operating arm 62 of a small switch 63 such as a Microswitch. As is well known to those skilled in the art, the Microswitch 63 can have normally open or normally closed contacts to perform the desired function. As can be seen, the microswitch 63 is sufficiently small so that it can be mounted on one side of the body 11.

Additional means is provided for ascertaining the position of the shutter member 31 and consists of a flag 66 which is mounted on the other end of the output shaft 42 of the solenoid and is movable between the safe position in which the shutter member closes off the radiation source and in an unsafe position in which the radiation can pass from the source through the window 33.

Additional means is provided to make the enclosure with radiation source fail-safe and consists of a sleeve 71 which is threaded into the upper body section 11a. The sleeve 71 is provided with a bore 72 and has a pin 73 slidably mounted therein. A generally conical nose 74 is mounted on the inner extremity of the pin 73 and is adapted to engage the shutter member (see FIG. 4). A spring 76 is mounted on the pin 73 and has one end engaging the nose 74 and has the other end engaging a portion of the sleeve 41 and yieldably urges the nose 74 toward the shutter member 31. Means is provided for releasing the nose 74 carried by the pin 73 and consists of a pair of nuts 77 formed of a suitable material such as Nylon which will melt at a predetermined temperature. Thus, when nuts 77 are melted, they release the pin 73 to permit the spring 76 to urge the shutter member 31 to a closed position against the force of the rotary solenoid 41 if it is energized.

Operation of the enclosure with radiation source may now be briefly described as follows. Let it be assumed that the enclosure with radiation source has been mounted in sheet gauging apparatus such as that described in copending application Ser. No. 792,007, filed Jan. 17, 1969, and that it is desired to introduce radiation through a sheet such as a sheet of paper from the enclosure with the radiation source.

When it is desired to introduce radiation through or toward the sheet, the shutter member is moved to an open position by energization of the rotary solenoid 41. This causes rotation of the shaft 32 and the shutter member 31 carried thereby to move it to the solid line position shown in FIG. 4. The shutter member 31 remains in this position as long as the rotary solenoid is energized. As soon as the rotary solenoid is deenergized, spring means provided on the rotary solenoid returns the shutter member 31 to the closed or broken-line position shown in FIG. 4 to prevent any further radiation from escaping from the enclosure. Thus, in the event of above power failure, it can be seen that the enclosure with radiation source is fail-safe and that the shutter member 31 is automatically returned to the closed position. When the shutter member is moved to a closed position, the pin 61 is shifted to operate the switch 63 which can be used for operating other devices to give an auxiliary indication of the position of the shutter member 31.

Additional fail-safe means is provided by the nuts 77 and the associated mechanism. As explained previously, nuts 77 are formed of a material which will melt at a predetermined temperature as, for example, in the case of fire in the vicinity of the enclosure with the radiation source. The heat from the fire will melt the nuts and will permit the spring 76 to shift the pin 73 to the left as viewed in FIG. 4 and to move the shutter member 31 to a closed position so that in the event the apparatus in which the enclosure with the radiation source is mounted is destroyed, the source will be closed off and no harmful radiation will escape therefrom. This also facilitates its recovery without endangering the recovery personnel. The flag 66 also on the exterior of the enclosure gives a visual indication of whether or not the shutter member is closed.

From the foregoing, it can be seen that there has been provided a relatively simple enclosure with a radiation source therein. Since it is formed of a relatively dense material, i.e., Mallory metal, it is relatively compact and, therefore, requires very little space. Also, it can be constructed relatively economically. In addition, the enclosure with radiation source is fail-safe under conditions of power failure and fire.

We claim:

1. In an enclosure with radiation source, a body, said body having a cavity formed therein, a radiation source disposed in said cavity, said body being formed of sufficient material to prevent excessive radiation from passing therethrough from said source, a passage in said body in alignment with said source whereby radiation from said source can pass through said passage, shutter means carried by the body and movable between open and closed positions with respect to said passage, said shutter means being formed of a material so that when it is in a closed position it prevents excessive radiation from said source from passing through said passage, said shutter means in an open position permitting radiation from said source to pass through said passage, means yieldably urging said shutter means towards a closed position, solenoid operated means for moving said shutter means to an open position against the force of the yieldable means, and temperature responsive means independent of said solenoid operated means for moving said shutter means to a closed position when a predetermined temperature is reached even though said solenoid operated means remains energized.

2. An enclosure with radiation source as in claim 1 wherein said body is formed of first and second sections and wherein said cavity is formed in said second section and wherein said radiation source is disposed in the cavity in said second section and wherein the passage and the shutter means are disposed in the first section together with a window formed of a material transparent to radiation mounted in said first section and covering said passage.

3. An enclosure with radiation source as in claim 1 wherein said solenoid operated means for moving said shutter means to an open position includes a rotary solenoid secured to the second section.

4. An enclosure with radiation source as in claim 1 together with means mounted in the body for sensing the position of the shutter means and switch means carried by the body and operated by the means for sensing the position of the shutter means.

5. An enclosure with radiation source as in claim 1 together with visual means carried on the body indicating whether said shutter means is in an open or closed position.

6. In an enclosure with radiation source, a body, said body having a cavity formed therein, a radiation source disposed in said cavity, said body being formed of sufficient material to prevent excessive radiation from passing therethrough from said source, a passage in said body in alignment with said source whereby radiation from said source can pass through said passage, shutter means carried by the body and movable between open and closed positions with respect to said passage, said shutter means being formed of a material so that when it is in a closed position it prevents excessive radiation from said source from passing through said passage, said shutter means in an open position permitting radiation from said source to pass through said passage, means yieldably urging said shutter means towards a closed position, means for moving said shutter means to an open position against the force of the yieldable means, and temperature responsive means for moving said shutter means to a closed position when a predetermined temperature is reached, said temperature responsive means including a sleeve mounted in said body, a pin slidably mounted in said sleeve adapted to engage said shutter means, spring means yieldably urging said pin into engagement with said shutter means and temperature responsive means mounted on said pin and releasing said pin when a predetermined temperature is reached.

7. An enclosure with radiation source as in claim 6 wherein said means mounted on said pin has at least one plastic nut threaded on one end of said pin.

* * * * *